US012487396B2

United States Patent
Murphy et al.

(10) Patent No.: US 12,487,396 B2
(45) Date of Patent: Dec. 2, 2025

(54) METHOD AND APPARATUS FOR FABRICATION OF LARGE THREE-DIMENSIONAL SINGLE COLLOIDAL CRYSTALS FOR BRAGG DIFFRACTION OF INFRARED LIGHT

(71) Applicants: NanoRacks, LLC, Webster, TX (US); New Jersey Institute of Technology, Newark, NJ (US); New York University, New York, NY (US); Universities Space Research Association, Columbia, MD (US)

(72) Inventors: Mary Murphy, Rockville, MD (US); Qian Lei, Piscataway, NJ (US); Boris Khusid, New Providence, NJ (US); Andrew D. Hollingsworth, Princeton, NJ (US); Paul Chaikin, New York, NY (US); William V. Meyer, Lakewood, OH (US)

(73) Assignees: Nano Racks, LLC, Webster, TX (US); New Jersey Institute of Technology, Newark, NJ (US); New York University, New York, NY (US); Universities Space Research Association, Columbia, MD (US)

( * ) Notice: Subject to any disclaimer, the term of this patent is extended or adjusted under 35 U.S.C. 154(b) by 106 days.

(21) Appl. No.: 18/192,833

(22) Filed: Mar. 30, 2023

(65) Prior Publication Data
US 2023/0393330 A1 Dec. 7, 2023

Related U.S. Application Data

(60) Provisional application No. 63/365,667, filed on Jun. 1, 2022.

(51) Int. Cl.
*G02B 6/02* (2006.01)

(52) U.S. Cl.
CPC ..... *G02B 6/02171* (2013.01); *G02B 6/02123* (2013.01)

(58) Field of Classification Search
CPC . G02B 1/005; G02B 6/02123; G02B 6/02171
See application file for complete search history.

(56) References Cited

U.S. PATENT DOCUMENTS 6,123,845 A * 9/2000 Asher ................. G02B 6/1225
                                                      210/500.22
6,946,086 B2 * 9/2005 Foulger ............... G01N 33/545
                                                      436/116

(Continued)

FOREIGN PATENT DOCUMENTS

CN       101349779 A  *  1/2009  .............. G02B 6/02

OTHER PUBLICATIONS

Gulden et al., "Three-dimensional structure of a single colloidal crystal grain studied by coherent x-ray diffraction," Opt. Express vol. 20, No. 4, pp. 4039-4049 (Year: 2012).*

(Continued)

*Primary Examiner* — Daniel Petkovsek
(74) *Attorney, Agent, or Firm* — Bookoff McAndrews, PLLC

(57) ABSTRACT

A three-dimensional Bragg grating may include a single colloidal crystal that includes a plurality of repeated layers of material having different refractive indexes. A sample cell for producing a volume Bragg grating may include an internal shape that forms at least one capillary cell having a flat surface and rounded edges. A method of producing a three-dimensional Bragg grating may include: suspending (Continued)

insoluble particles in a host fluid to form a suspension; and exposing the suspension to a sustained microgravity environment.

20 Claims, 14 Drawing Sheets

(56) References Cited

U.S. PATENT DOCUMENTS

| | | | |
|---|---|---|---|
| 7,106,938 | B2 | 9/2006 | Baek et al. |
| 7,700,390 | B2 | 4/2010 | Wang et al. |
| 7,727,410 | B2 | 6/2010 | Wang et al. |
| 8,384,988 | B2 | 2/2013 | Wu et al. |
| 8,580,031 | B2 | 11/2013 | Numata et al. |
| 9,013,794 | B2 | 4/2015 | Neauport et al. |
| 9,182,528 | B2 | 11/2015 | Pérez et al. |
| 10,908,423 | B2 | 2/2021 | Oh |
| 11,086,218 | B1 | 8/2021 | Brueck et al. |
| 2002/0045030 | A1* | 4/2002 | Ozin ............... B82Y 40/00 428/173 |
| 2005/0095417 | A1* | 5/2005 | Jiang ............... G01N 21/4788 428/304.4 |
| 2005/0111807 | A1* | 5/2005 | Hino ............... B82Y 20/00 385/129 |
| 2006/0165984 | A1* | 7/2006 | Miguez ............... C30B 29/60 428/375 |
| 2008/0131660 | A1 | 6/2008 | Noda et al. |
| 2022/0017719 | A1* | 1/2022 | Jurewicz ............... C08K 3/041 |

OTHER PUBLICATIONS

English Translation of CN-101349779-A, 5 pages (Year: 2009).*
Xia, Y., Kamata, K., Lu, Y. (2004). Photonic Crystals. In: Di Ventra, M., Evoy, S., Heflin, J.R. (eds) Introduction to Nanoscale Science and Technology. Nanostructure Science and Technology. Springer, Photonic Crystals—Abstract Only, Boston, MA 2004, https://doi.org/10.1007/1-4020-7757-2_21 (20 pages).
S. Y. Lin, J. G. Fleming, D. L. Hetherington, B. K. Smith, R. Biswas, K. M. Ho, M. M. Sigalas, W. Zubrzycki, S. R. Kurtz & Jim Bur, A three-dimensional photonic crystal operating at infrared wavelengths, Nature 394 251-253, 1998, https://doi.org/10.1038/28343.
Daniel Morphew, James Shaw, Christopher Avins, and Dwaipayan Chakrabarti, Programming Hierarchical Self-Assembly of Patchy Particles into Colloidal Crystals via Colloidal Molecules, ACS Nano 12, 2355-2364, 2018 https://doi.org/10.1021/acsnano.7b07633.
M. Kapoor, Chapter 3. Chapter-3, Electromagnetic BandGap Structures, in: Thesis: Design Fabrication and Analysis of Tunable Planar Microwave Devices Using EBG Structures, Sep. 15, 2012, Department of Physics and Computer Science, Dayalbag Educational Institute, Dayal Bagh Rd, DayalBagh, Agra, Uttar Pradesh 282005, India, http://hdl.handle.net/10603/7246 (accessed May 25, 2022).
Martin F. Schubert, J.-Q. Xi, Jong Kyu Kim, and E. Fred Schubert, Distributed Bragg reflector consisting of high-and low-refractive-index thin film layers made of the same material Appl. Phys. Lett. 90, 141115 (2007); https://doi.org/10.1063/1.2720269.
B. Ben Bakir, Ch. Seassal, X. Letartre, and P. Viktorovitch, Surface-emitting microlaser combining two-dimensional photonic crystal membrane and vertical Bragg mirror, Appl. Phys. Lett. 88, 081113 (2006); https://doi.org/10.1063/1.2172730.
Guozhen Liang, Xuechao Yu, Xiaonan Hu, Bo Qiang, Chongwu Wang, Qi Jie Wang, Mid-infrared photonics and optoelectronics in 2D materials, Materials Today 51, 294-316 (2021) https://doi.org/10.1016/j.mattod.2021.09.021.
Jianping Ge, Yadong Yin, Angewandte Chemie, Responsive Photonic Crystals, 50(7), 1492-1522 (2011) https://doi.org/10.1002/anie.200907091.
L. Huang, B. Dong, Z.G. Yu, J. Zhou, Y. Ma, Y.-W. Zhang, C. Lee, K.-W. Ang, Mid-infrared modulators integrating silicon and black phosphorus photonics, Materials Today Advances 12, 100170 (2021) https://doi.org/10.1016/j.mtadv.2021.100170.
Goran Z. Mashanovich, Lauren Reid, Georgi Georgiev, Chen Wei, Yanli Qi, Callum J. Stirling, Ahmed Osman, Yangbo Wu, Zhibo Qu, Jon Heffernan, Kristian M. Groom, Vinita Mittal, Wei Cao, Li Ke, David J. Thomson, Colin J. Mitchell, Milos Nedeljkovic, Group IV mid-infrared photonics for communications and sensing, Proc. SPIE 12004, Integrated Optics: Devices, Materials, and Technologies XXVI, 1200402 (Mar. 5, 2022); doi: 10.1117/12.2616700.
Ting Shao, Laixi Sun, Chun Yang, Xin Ye, Shufan Chen and Xuan Luo, Convenient and Efficient Fabrication of Colloidal Crystals Based on Solidification-Induced Colloidal Assembly, Nanomaterials 2019, 9(4), 575; https://doi.org/10.3390/nano9040575.
Chun-Wei Chen, Chien-Tsung Hou, Cheng-Chang Li, Hung-Chang Jau, Chun-Ta Wang, Ching-Lang Hong, Duan-Yi Guo, Cheng-Yu Wang, Sheng-Ping Chiang, Timothy J. Bunning, Iam-Choon Khoo, & Tsung-Hsien Lin, Large three-dimensional photonic crystals based on monocrystalline liquid crystal blue phases, Nat Commun 8, 727 (2017). https://doi.org/10.1038/s41467-017-00822-y.
Emil Zolotoyabko, Basic Concepts of X-Ray Diffraction, Wiley, 2014, Abstract Only, ISBN: 978-3-527-33561-9 (3 pages).
Michael A. Lam, Boris Khusid, Lou Kondic, William V. Meyer, Role of diffusion in crystallization of hard-sphere colloids, Physical Review E 104, 054607 (2021) https://doi.org/10.1103/PhysRevE.104.054607.
Elsesser, M., et al., (Supporting Information—Revisiting the synthesis of a well known comb-graft copolymer stabilizer and its application to the dispersion polymerization of PMMA in organic media) Langmuir vol. 26 Issue 23, Nov. 8, 2010, 17989-17996 (7 pages).
Dickinson, B.C., et al., (A Palette of Fluorescent Probes with Varying Emission Colors for Imaging Hydrogen Peroxide Signaling in Living Cells) J. Am. Chem. Soc. (2010) 132, 5906-5915 (10 pages).
Sauers, R.R., et al., (Shaping the Absorption and florescence bands of a class of efficient, photoactive chromophores;: synthesis and properties of some new 3H-xanthen-3-) Dyes and Pigments (1987) 8, Abstract Only, (4 pages).
Elsesser, M., et al., (Large Core-Shell Poly(methyl methacrylate) Colloidal Clusters: Synthesis, Characterization, and Tracking). Langmuir (2011), 27(3), 917-927 (11 pages).
Phan, S-E., et al., (Phase transition, equation of state, and limiting shear viscosities of hard-sphere dispersions) Phys. Rev. E (1996) 54 (6) 6633-6645 (4 pages).
Kodger, T.E., et al., (Stable, Fluorescent Polymethylmethacrylate Particles for the Long-Term Observation of Slow Colloidal Dynamics) Langmuir (2017) 33, 6382-6389 (8 pages).

* cited by examiner

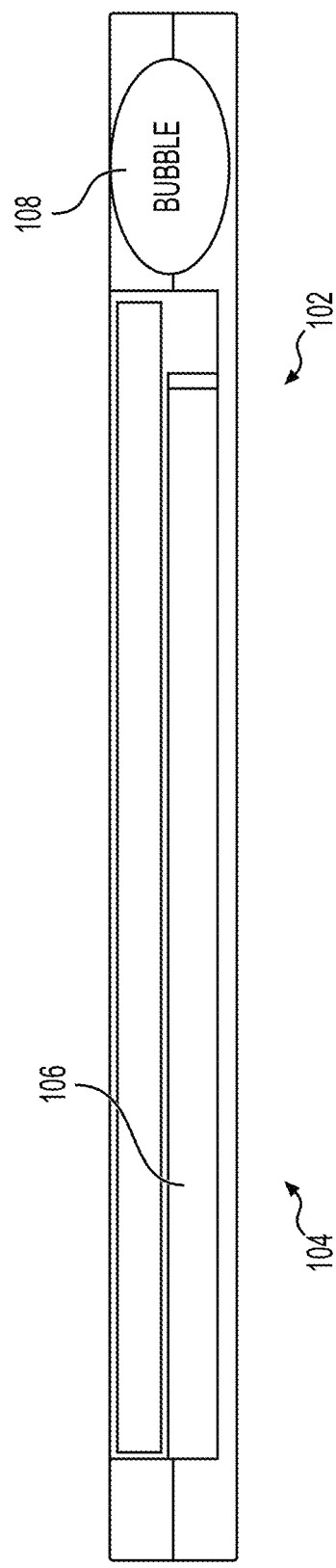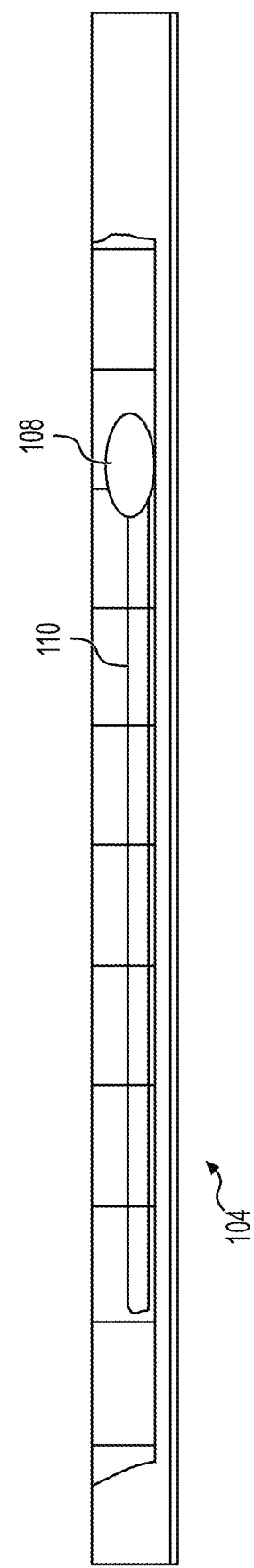
FIG. 1A
FIG. 1B

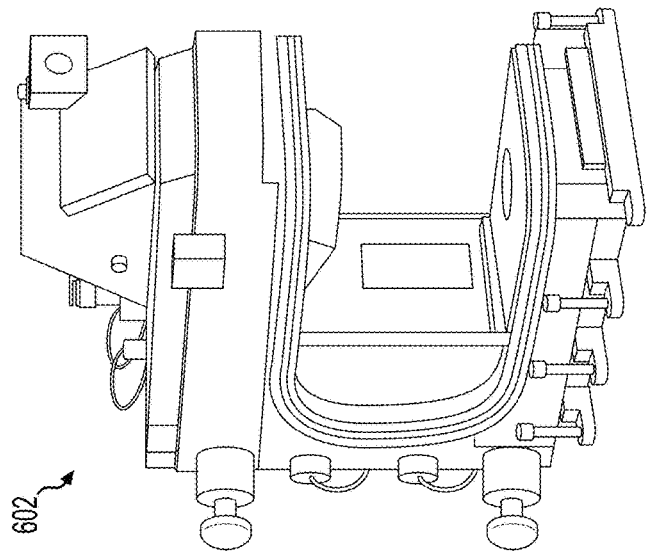
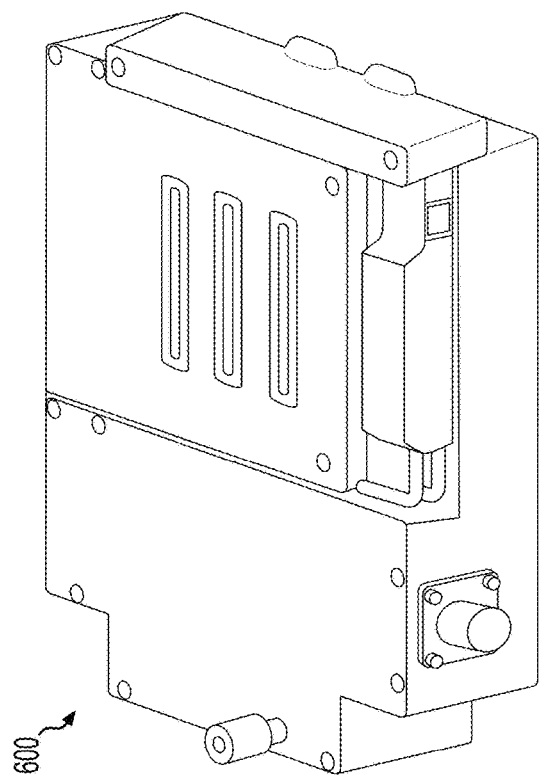
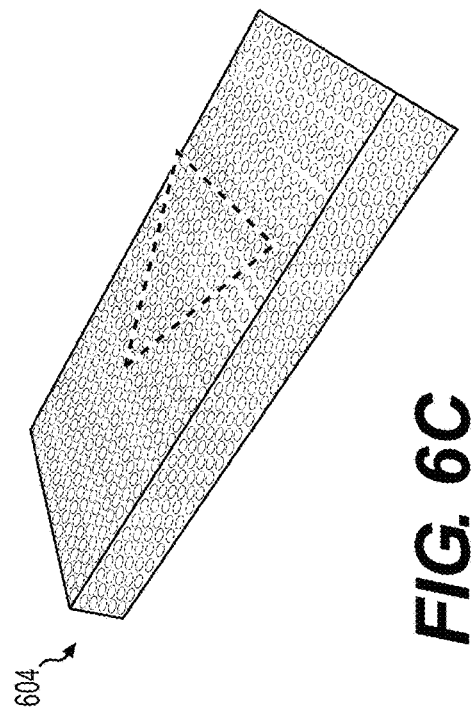
FIG. 6B
FIG. 6A
FIG. 6C

METHOD AND APPARATUS FOR FABRICATION OF LARGE THREE-DIMENSIONAL SINGLE COLLOIDAL CRYSTALS FOR BRAGG DIFFRACTION OF INFRARED LIGHT

CROSS-REFERENCE TO RELATED APPLICATION

This patent application claims the benefit of priority to U.S. Provisional Application No. 63/365,667, filed on Jun. 1, 2022, the entirety of which is incorporated herein by reference.

GOVERNMENT INTEREST

This invention was made with U.S. Government support under NSF CBET grants 1832260 and 1832291, NASA grants 80NSSC19K1655, NNX13AR67G, and NASA Glenn Engineering and Research Support (GEARS) Contract: 80GRCO20D0003. The government has certain rights in the invention.

TECHNICAL FIELD

The present disclosure relates to various aspects of photonic crystals and methods for making three-dimensional photonic crystals from colloidal particles. More specifically, this disclosure relates to one or more aspects of the fabrication of large three-dimensional Bragg gratings operating at infrared wavelengths. Due to the unique properties of these Bragg gratings, these photonic crystals may be beneficial for applications in remote sensing, fiber-optic communication, materials processing, chemical analysis, biomedical diagnostics, optical computing, security and defense.

BACKGROUND

A three-dimensional photonic crystal is the optical analogy to an atomic lattice, e.g., in which a refractive index repeats periodically in three directions on the scale of the light wavelength. Photonic crystals operating at infrared wavelengths are expected to be used in a variety of optical, sensor and communication applications, and have been investigated widely. In particular, a distributed Bragg reflector is an example of a one-dimensional photonic crystal which may be used for infrared waveguides. Assembled from repeated layers of materials with different refractive indices, such a crystal may form a periodic variation of the effective refractive index in the guide. As a result of multiple reflections, light is able to propagate in this structure only within a certain range of wavelengths. A Bragg mirror is an example of a two-dimensional photonic crystal assembled from thin layers of materials with different refractive indices deposited on a substrate. As a result of the interference of light reflected from the different layers of this stack, a mirror can be designed with an angle-dependent reflectivity specified at different wavelengths.

A conventional fabrication process of colloidal crystals for photonic applications generally includes the use of complicated and expensive microfabrication techniques. An alternative fabrication technique has been developed that takes the form of an ordered assembly of colloidal particles suspended in a host fluid; also referred to as a colloidal crystal. Various methods have been developed for the preparation of colloidal crystals over the past decades, e.g., methods based on the self-assembly of particles by colloidal forces often assisted by external forces such as gravitational, electric and magnetic forces. However, such methods do not appear able to produce colloidal crystals larger than several hundreds of micrometers. One limiting factor may include kinetic limitations. For example, particles may be trapped into metastable configurations for a long time, e.g., due to a lower mobility of multi-particle structures compared to that of individual particles.

Compared to polycrystalline crystals, single crystals have continuous, uniform, and highly-ordered structure, which enables single crystals to possess unique properties. For example, single crystal semiconductors have found extensive use in optical, electronic and optoelectronic applications, such as light-emitting diodes, photodetectors, wide-bandgap devices, high-power lasers and consumer electronics.

However, fabrication of large three-dimensional single colloidal crystals on Earth remains a challenge as the particle assembly is strongly influenced by gravity effects, such as sedimentation and jamming of the particles that is accompanied by convection of the host fluid. These gravity effects compete with interparticle forces during the slowly evolving formation of colloidal crystals. A requirement for precise matching of densities between the particles and a host fluid to avoid undesirable gravity effects severely limits the possibilities for building large colloidal crystals on Earth.

This disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

The subject of the present disclosure is a method for fabrication of large three-dimensional single colloidal crystals for coherent scattering of infrared waves. Bragg diffraction from a colloidal crystal occurs when light is scattered in mirror-like reflection by successive particle layers and undergoes constructive interference. This leads to Bragg's law, which describes the condition for the constructive interference to be at its strongest:

$$n\lambda = 2d \sin[\theta]$$

where $\lambda$ is the light wavelength, $n=1, 2, \ldots$ is the diffraction order, d is the grating constant of the crystal that is proportional to the particle size and depends on successive crystallographic planes of the crystalline lattice, and $\theta$ is the angle between a light ray incident on a crystal surface and the line perpendicular to the surface at the point of incidence. The grating constant d can be varied by changing the particle size and volume fraction.

Fabrication of large three-dimensional single colloidal crystals on Earth remains a challenge as the particle assembly is strongly influenced by gravity effects, such as sedimentation and jamming of the particles that is accompanied by convection of the host fluid. These gravity effects compete with interparticle forces during the slowly evolving formation of colloidal crystals. A requirement for precise matching of densities between the particles and a host fluid to avoid undesirable gravity effects severely limits the possibilities for building large colloidal crystals on Earth.

It has been discovered that cessation of particle long-time diffusion above certain volume fractions does not suppress the crystallite growth in hard-sphere colloids. Once a crystallite forms, its growth may then be controlled by particle diffusion in a depletion zone surrounding the crystallite. In one aspect, even a very slow gravitational sedimentation of particles in dense colloids on Earth can arrest colloidal crystallization by redirecting the particle transport.

The present disclosure addresses one or more of the above-described difficulties, and, in aspects, is directed at providing a method for fabricating a large single colloidal crystal with an accurate three-dimensional periodic arrangement of colloidal particles. In one example, a suspension of desirable colloidal particles in a host fluid transferred to a sample cell (e.g., a cuvette) and delivered to Low-Earth Orbit (LEO). A long-duration microgravity environment in a LEO environment offers a unique environment to fabricate colloidal crystals in non-buoyancy-matched suspensions without the detrimental effects of gravity. For these photonic crystals to operate in the desirable range of an infrared light wavelength, $\lambda$, particle size is selected such that the grating constant of the crystal d in Eq. (1) is selected to be comparable with $\lambda$.

In one aspect, the present disclosure utilizes a cuvette-type cell, containing the crystal, the colloidal particles, the host fluid, and an internal structure configured for a desired specific sedimentation process. Multiple cells may be placed within a sealed, environment-controlled container, which may be hosted in a micro or zero gravity environment such as onboard the International Space Station (ISS) in Low Earth Orbit. Such hosting may be configured to provide power, data, and/or multiple levels of containment for crew safety requirements. The container may conform to all required NASA regulations for performing experiments in the microgravity environment of the ISS. After a sufficient period of time on station for colloidal sedimentation, the container payload may be returned and processed.

In one aspect, a three-dimensional Bragg grating may include a single colloidal crystal that includes a plurality of repeated layers of material having different refractive indexes. At least one of the plurality of repeated layers may be formed from micron-sized spheres. The micron-sized spheres may have been stabilized against aggregation. The three-dimensional Bragg grating may further include at least one stabilizing layer. The stabilization of the micron-sized spheres may be provided by the at least one stabilizing layer. The at least one stabilizing layer may be formed from a graft copolymer including an insoluble anchor group and soluble side chains. The micron-sized spheres may have a particle size variation of less than 5%. The three-dimensional Bragg grating may further include a fluorescent dye incorporated covalently to constituent polymer chains comprising the micron-sized spheres.

In one aspect, a sample cell for producing a volume Bragg grating may include an internal shape that forms at least one capillary cell having a flat surface and rounded edges. The sample cell may further include a seal configured to limit or inhibit solvent evaporation from the at least one capillary cell, e.g., over a period of fabrication of a crystal, or to less than 2% over a period of 3 months, or the like. The sample cell may be configured to maintain, in a low-earth-orbit environment, a temperature of the at least one capillary cell above a freezing temperature of a solvent for generating the volume Bragg grating and below a boiling temperature of the solvent. The sample cell may be configured to withstand a gravity acceleration of up to 6g's. The sample cell may be configured to enable addition and/or removal of at least one bubble from within the at least one capillary cell.

In one aspect, a method of producing a three-dimensional Bragg grating may include: suspending particles, e.g., insoluble synthetic particles, or in some embodiments, particles that are insoluble, single-component or composite, homogenous or heterogeneous, and spherical or anisotropic, in a host fluid to form a suspension; and exposing the suspension to a sustained microgravity environment. In various embodiments, the host fluid may have a refractive index matching or not matching a refractive index of the suspended particles. The method may further include: supplying the suspension to at least one capillary cell of a sample cell, the at least one capillary cell having a flat or curved surface and rounded edges. In some embodiments, a surface or edge of the at least one capillary cell may be matched to a lattice structure of a cell wall surface of a crystal to be grown. Exposing the suspension to a sustained microgravity environment may include: delivering the sample cell to low-earth-orbit; and maintaining, in the low-earth-orbit, a temperature of the at least one capillary cell above a freezing temperature of the host fluid below a boiling temperature of the host fluid. The method may further include: delivering the sample cell from the low-earth-orbit to Earth; and removing at least one single colloidal crystal from the at least one capillary cell of the sample cell. The method may further include removing or adding at least one bubble from the at least one capillary cell. The insoluble synthetic particles may have a particle size such that a grating constant of the produced three-dimensional Bragg grating is comparable with a wavelength of infrared light for which the three-dimensional Bragg grating is configured for coherent scattering.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1A depicts a schematic of a capillary structure, according to one or more aspects of this disclosure.

FIG. 1B depicts a picture of an exemplary embodiment of the capillary structure of FIG. 1A.

FIG. 6A depicts a perspective view of an exemplary embodiment of a sample module, according to one or more aspects of this disclosure.

FIG. 6B depicts a perspective view of a three-dimensional micro-scope, according to one or more aspects of this disclosure.

FIG. 6C depicts an exemplary perspective view of an individual slice of three-dimensional imaging captured by the three-dimensional micro-scope of FIG. 6B, according to one or more aspects of this disclosure.

DETAILED DESCRIPTION OF EMBODIMENTS

Figure 1C:
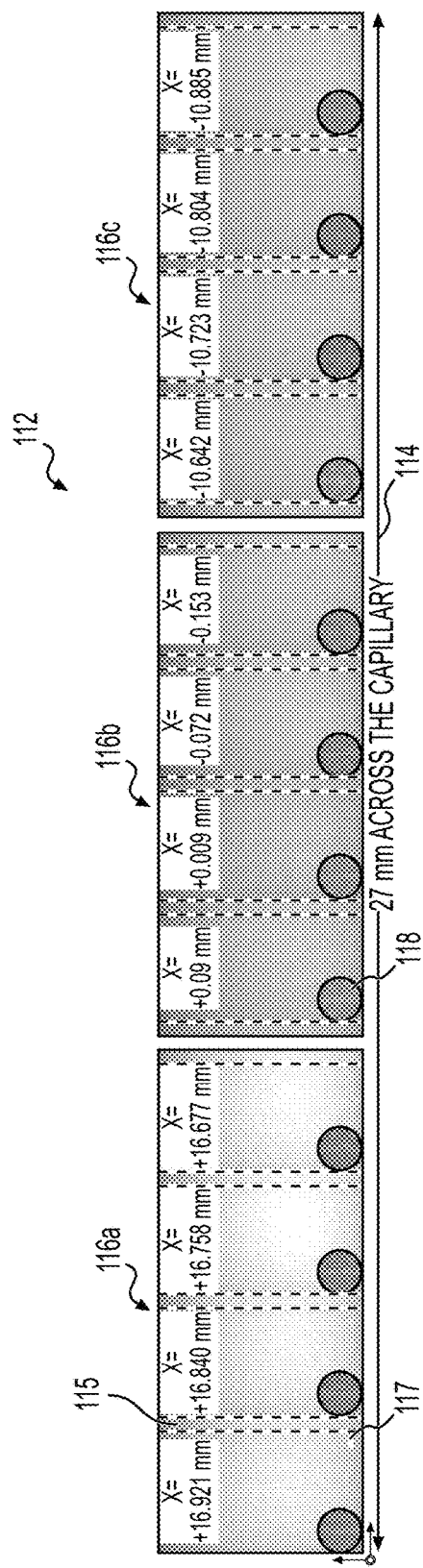
FIG. 1C depicts confocal images of a top layer of particles in a sample crystal taken at different positions along an x axis, according to one or more aspects of this disclosure.

The equilibrium phase transition of a system of hard spheres from a liquid to a crystalline phase is a paradigm success story of statistical mechanics and the utility of computer simulations in discovering the properties of matter. It had been theorized that hard spheres (particles with no interactions other than that they don't interpenetrate) form a liquid phase up to a volume fraction, $\varphi=0.49$, a crystal phase above $\varphi=0.54$ and coexistence in between. However, ground-based experimental results exhibited small sedimented crystallites of mixed close packed structures and a high-density glass phase. One or more aspects of this disclosure address such difficulties.

According to one or more aspects of this disclosure, it is possible to generate a hard sphere, topological defect free, Face Centered Cubic (FCC) phase, 27 mm×1.5 mm×0.15 mm single colloidal crystal via growth in a micro or zero gravity environment such as on the international space station. The results here confirm that FCC is the ground state in this most elementary crystal, and that the slight difference in entropy between FCC and HCP (Hexagonal Close Packed), which have the same packing density, is sufficient to stabilize a physical sample. One of ordinary skill in the art should appreciate that the growth of a single colloidal crystal in space. as well as return of the crystal from orbit, may be adapted to new routes for in-space manufacturing of materials for infrared photonics.

Reference to any particular activity is provided in this disclosure only for convenience and not intended to limit the disclosure. A person of ordinary skill in the art would recognize that the concepts underlying the disclosed devices and methods may be utilized in any suitable activity. For example, while certain circumstances or conditions may be provided as examples, it should be understood that the techniques and technologies disclosed herein may be adapted to any suitable circumstance or condition. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The densest packing of spheres ($\varphi=\Pi/\sqrt{18}\sim 0.74$) is considerably higher than any disordered packing found so far ($\varphi<0.64$). This difference in packing fraction forms the basis of much of what is known about the transition from liquid to crystal in simple systems such as most elements. At $\varphi\sim 0.64$, the disordered spherical particles reach their maximum density, and are effectively "jammed" and have little if any volume to explore. On the other hand, in the same total volume and the same spheres, an arrangement of particles on a lattice can fill space to $\varphi=0.74$ before they touch and jam. Therefore, if the particles are arranged on a lattice, the particles at $\varphi=0.64$ have a lot of free volume to explore, their entropy is high and their Free energy is low. For hard spheres, the energy is infinite if they touch and zero if they don't, so they never touch and their energy is zero. From these simple arguments, one can conclude that a transition to a solid may take place before the density reaches 0.64. But, the calculation of the entropy, all of the possible configurations of the non-overlapping spheres at each density, has not been done analytically and may be difficult to do numerically. Computer-aided molecular dynamic simulations, however, have been used to predict the existence of the hard sphere transition and the critical concentrations: fluid to $\varphi=0.494$, crystal above $\varphi=0.545$ and coexistence between.

Although the densest packing is FCC, there are many other structures that have exactly the same density. The densest structure in one dimension is a line of touching spheres. The densest in two dimension is a stacking of the lines but shifted so that in the next layer a sphere sits between the two below forming a triangular lattice. If the triangular sphere packings are stacked in the third dimension, the layers may be offset so that each sits in the interstices of the one below. There are two ways of doing this from layer A: shifting up and to the right for layer B, or up and to the left for layer C. The FCC lattice is formed by the stacking ABCABCABC . . . . The Hexagonal Close Packed (HCP) lattice with exactly the same density is ABABAB . . . , so is the DHCP lattice, ABACABAC . . . , and there are an infinite number of such packings up to the random stacking of non-repeating layers, Random Hexagonal Close Packed (RHCP), ACBABCBACBAC . . . .

In subsequent terrestrial and microgravity experiments, the structure was determined to have produced crystals having RHCP stacking. Even in microgravity experiments, although in general agreement with previous simulations and experiments, there were indications of the absence of the high density glass phase and dendritic growth instabilities. Simulation determined that FCC is the stable crystal structure having a lower Free energy than HCP by about 0.002. Such simulation appeared to establish that for monodisperse hard spheres in equilibrium there is a low density fluid phase, a coexistence region, and a high density FCC crystal with no glass phase. However, it was still not possible to actually grow a crystal in reality to evaluate this simulated model. Thus, improvements to methods for making three-dimensional photonic crystals from colloidal particles may be beneficial.

In one aspect, unlike prior techniques in which samples were prepared in centimeter-scale cuvettes and were observed terrestrially, samples may be sealed in rectangular capillaries of 200 micron height and mounted on a temperature controlled stage configured for confocal microscopy studies on the Light Microscopy Module (LMM) on the International Space Station (ISS).

Three samples were investigated on the ISS. Of the three samples, C1 was completely dry, C2 had two bubbles on either side of the suspension which moved in different directions during the flight. C2 exhibited both crystalline and non-crystalline regions, the latter especially near the bubbles. Sample C3 had a single bubble on one side of the suspension which neither moved nor changed size during the course of the experiment. Sample C3 was returned to Earth and investigated. Reentry or the presence of earth gravity rendered the sample into reasonably large crystallites (~.3 mm) with clear cracks and other defects. Although the crystal sample C3 did not wholly survive return to Earth in the perfect form, its crystallization in space shows that large single crystals can be formed in the near orbit environment. Once formed, it may be possible to solidify/crosslink a suitable solvent to fix the crystal for return to Earth. This procedure may be adapted to in-space manufacturing of materials for infrared photonics.

FIG. 1A depicts a schematic of an exemplary embodiment of a sample cell 102, according to one or more aspects of this disclosure. The sample cell 102 has a capillary structure that includes at least one capillary cell 104 configured to receive a suspension 106 for growing a crystal. In some embodiments, at least one bubble 108 may be disposed in the at least one capillary cell 104.

FIG. 1B depicts picture of an exemplary embodiment of the capillary cell 104 in which a crystal 110 has been produced. FIG. 1C includes confocal images 112 (also referred to as frames and/or micrographs) of a top layer of particles in sample C3 taken at different positions along an x axis 114. The micrographs were taken with an overlap of ~10%, so that the images 112 were stitched together by overlapping the particle positions at the edges.

Figure 1D:
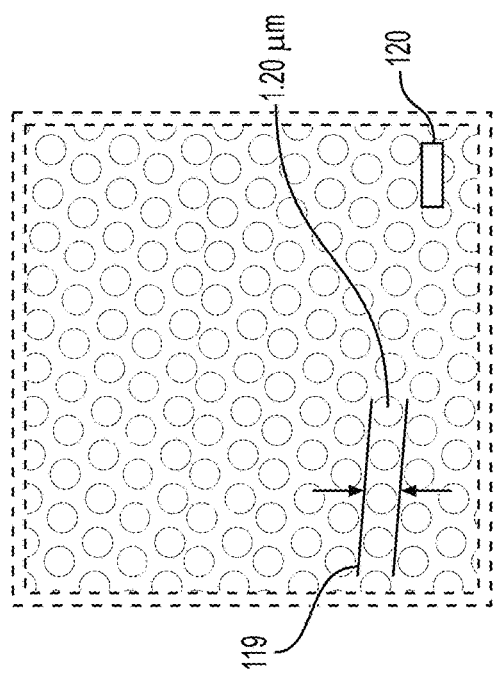
FIG. 1D depicts a detail view of a portion of the sample of FIG. 1C.

The micrographs 112 include three sections 116a-c of overlapping X scan—four frames 112 with overlap from right, middle, left of sample cell. The images collected by scanning along an X-direction were at Y=−0.02 mm deviated from a central line of the capillary cell 104 and Z=20 μm depth away from a top surface. The 10% overlap in terms of the cross correlation measurement is shown by narrow regions in annotated lines 115 to smoothly adjust intensity between each image and its neighbors. A scale bar 117 measures 5 μm. Results of 2D Fast Fourier Transform (FFT) of the grayscale values computed for every image over rectangular regions illustrated by the annotated lines are presented in the lower-left corner insets 118. Six points evenly spaced at 60 degree increments around a circle in the inset represent six main reciprocal vectors of the particle arrangement in a hexagonal lattice. A zoomed up square annotated region (FIG. 1D) illustrates the particle arrangement in hexagonal order with a characteristic distance 119, e.g., spacing between adjacent ordered particle arrays, at 1.20 μm, with a scale bar 120 measuring 2 μm. These images illustrate a single crystal with defect-free hexagonal arrangement of particles at a large scale.

Notably, the stitching reveals no breaks, grain boundaries, or topological defects over a length of 27 mm. The stitched-together images 112 present the entire superposition of images that can be scanned to observe that we are seeing a single colloidal crystal at least in one dimension. Similar scans in the y and z directions indicated a 3D single crystal with dimensions 27 mm×1.5 mm×0.15 mm essentially filling the observable region of the sample cell between the walls and the single bubble.

Figure 2A:
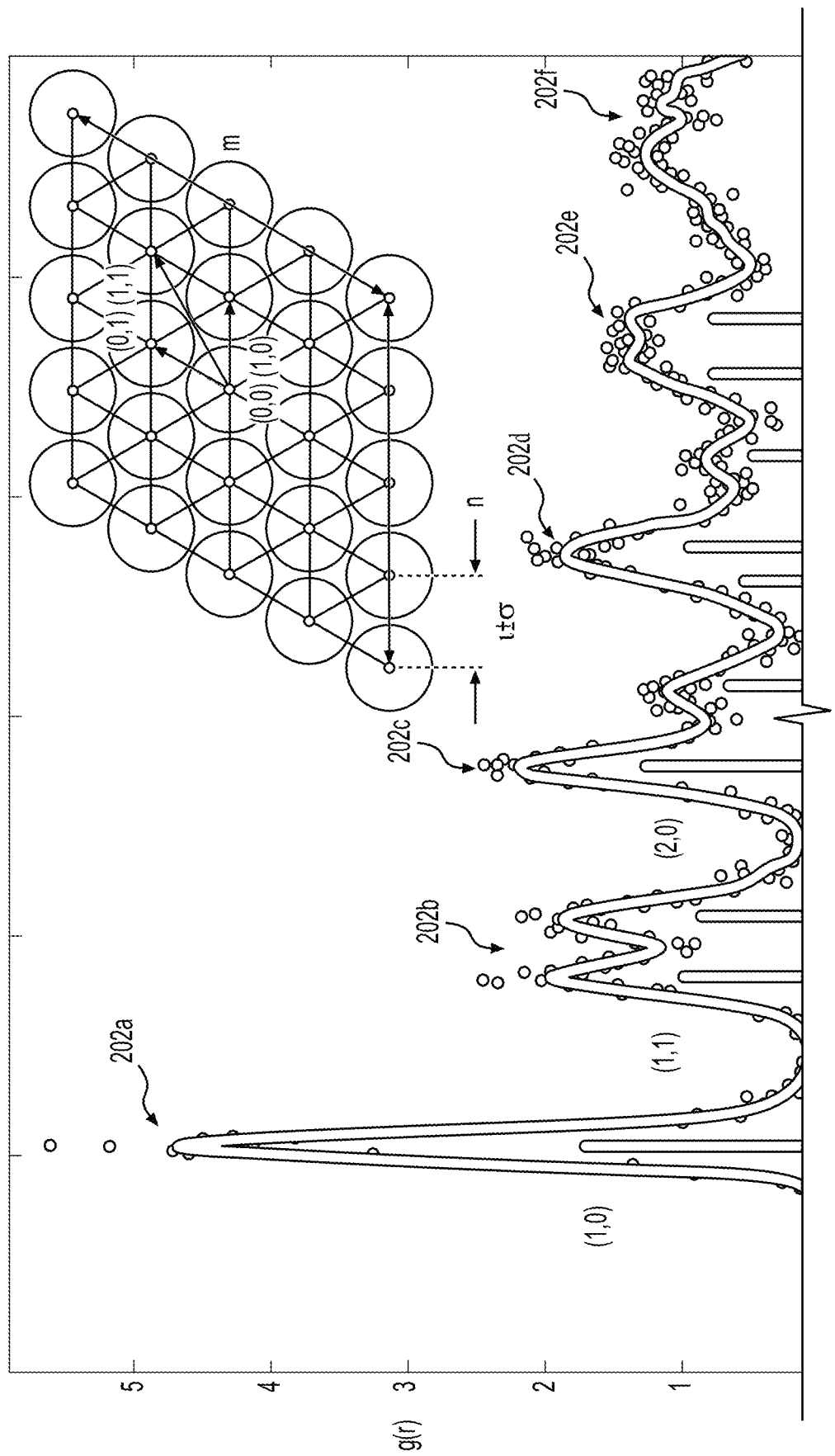
FIG. 2A depicts a grayscale Fast Fourier Transform (FFT) plot for the sample of FIG. 1C.

A grayscale FFT, plotted in FIG. 2A was used to identify 6 hexagonally arranged Bragg spots 202a-f. Specifically, the plot of FIG. 2A illustrates the long range order of the single crystal, in which the plotted points illustrate the radial distribution function (or pair correlation functions) (r) on an X-Y plane passing through the particle centers in a typical crystalline region in sample C3. The radial distribution function g(r) was averaged from five of the images 112 at different positions in the X-Y. This function g(r) further verifies the triangular lattice and provides additional collaboration of the lattice spacings.

Figure 2B:
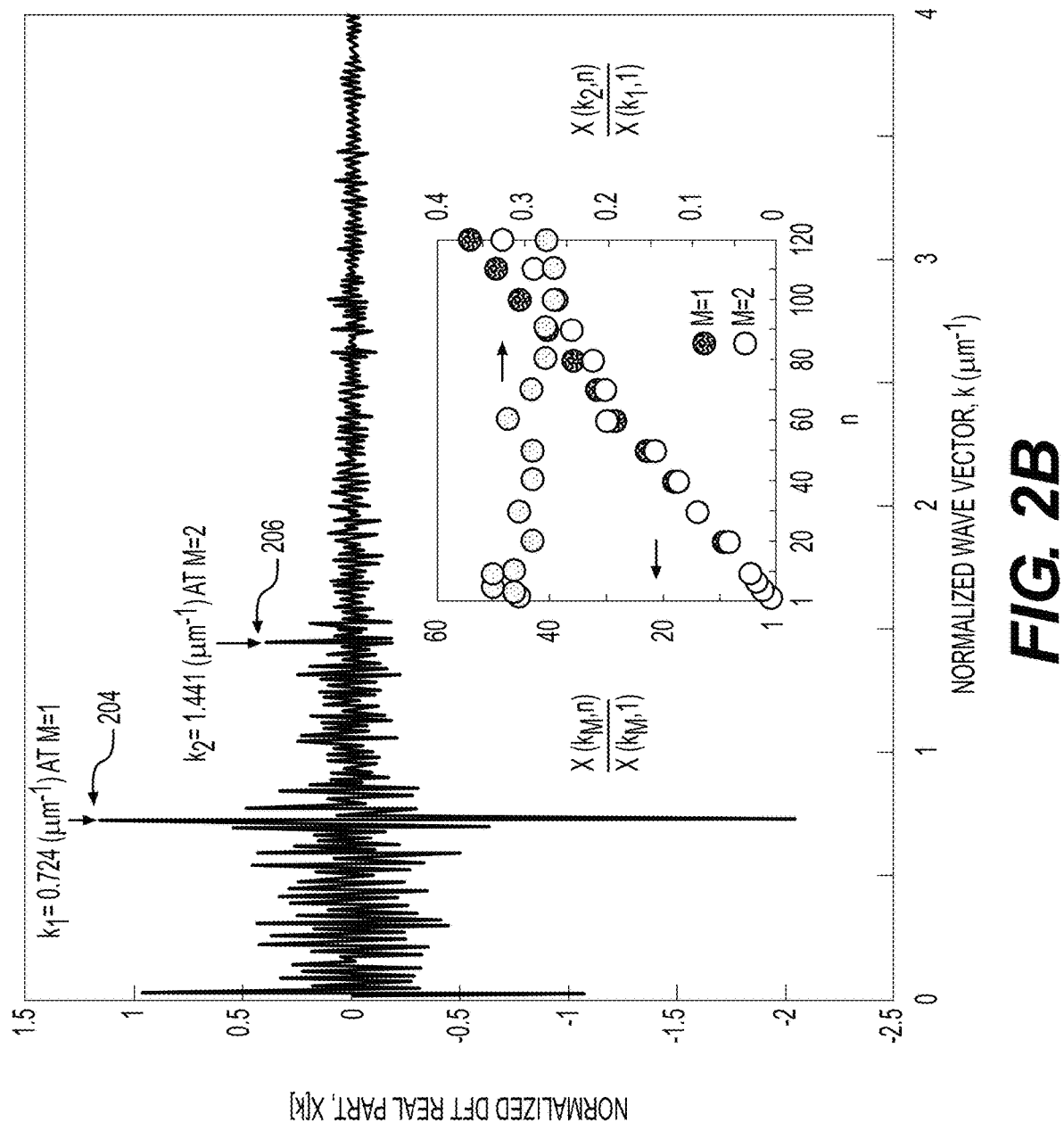
FIG. 2B depicts a one dimensional discrete Fourier Transform of a greyscale of the sample of FIG. 1C through annotation lines in FIG. 2A.

To verify the presence of a single coherent crystal along the 2.7 cm crystal length in the x direction, 342 images along x were stitched together, with straight lines drawn through particle centers in sets of 60-120 contiguous images. A one dimensional discrete Fourier Transform (1DFT) of the greyscale through these lines is plotted in FIG. 2B. The plot in FIG. 2B illustrates two sharp peaks 204 and 206 corresponding to 1/L and 2/L, with L=1.38 micron, e.g., the lattice spacing. Incoherence, e.g., from factors such as grain boundaries or powder patterns would have broadened the peaks, and not just damped them, and so is unlikely to have been present. The amplitude of the two peaks and their ratio is the result of the particle vibrations in the lattice, e.g., a Debye-Waller factor. From the Debye-Waller factor, the mean square displacement of the particles from the lattice sights is σ~0.20 μm, e.g., the same as from the plot in FIG. 2A, which is different from the direct measurement from the 0.15 μm obtained from particle tracking.

Figure 3A:
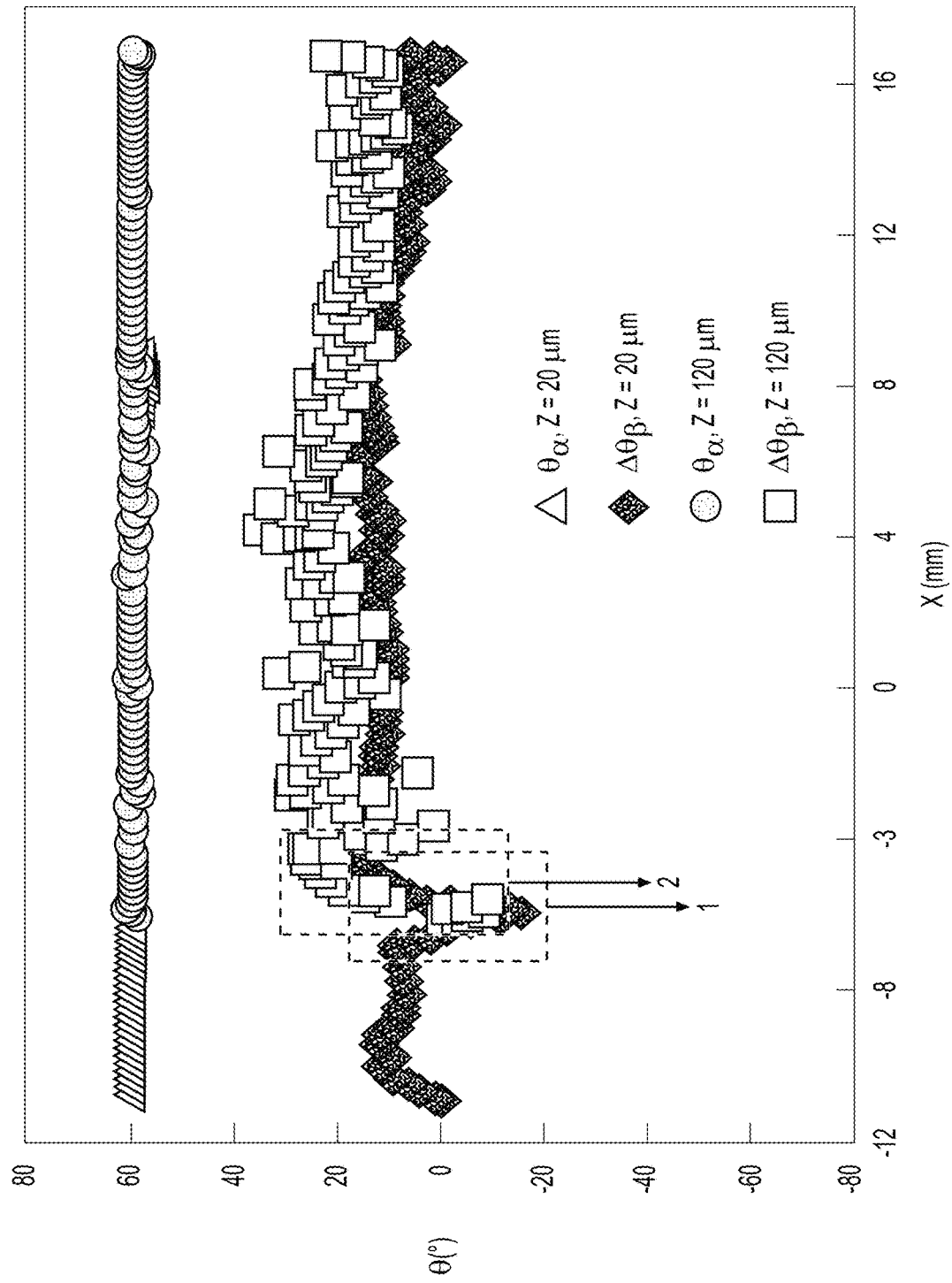
FIGS. 3A and 3B depict FFT spectra of grayscale values of images from FIG. 1C in an X-Y plane.
Figure 3B:
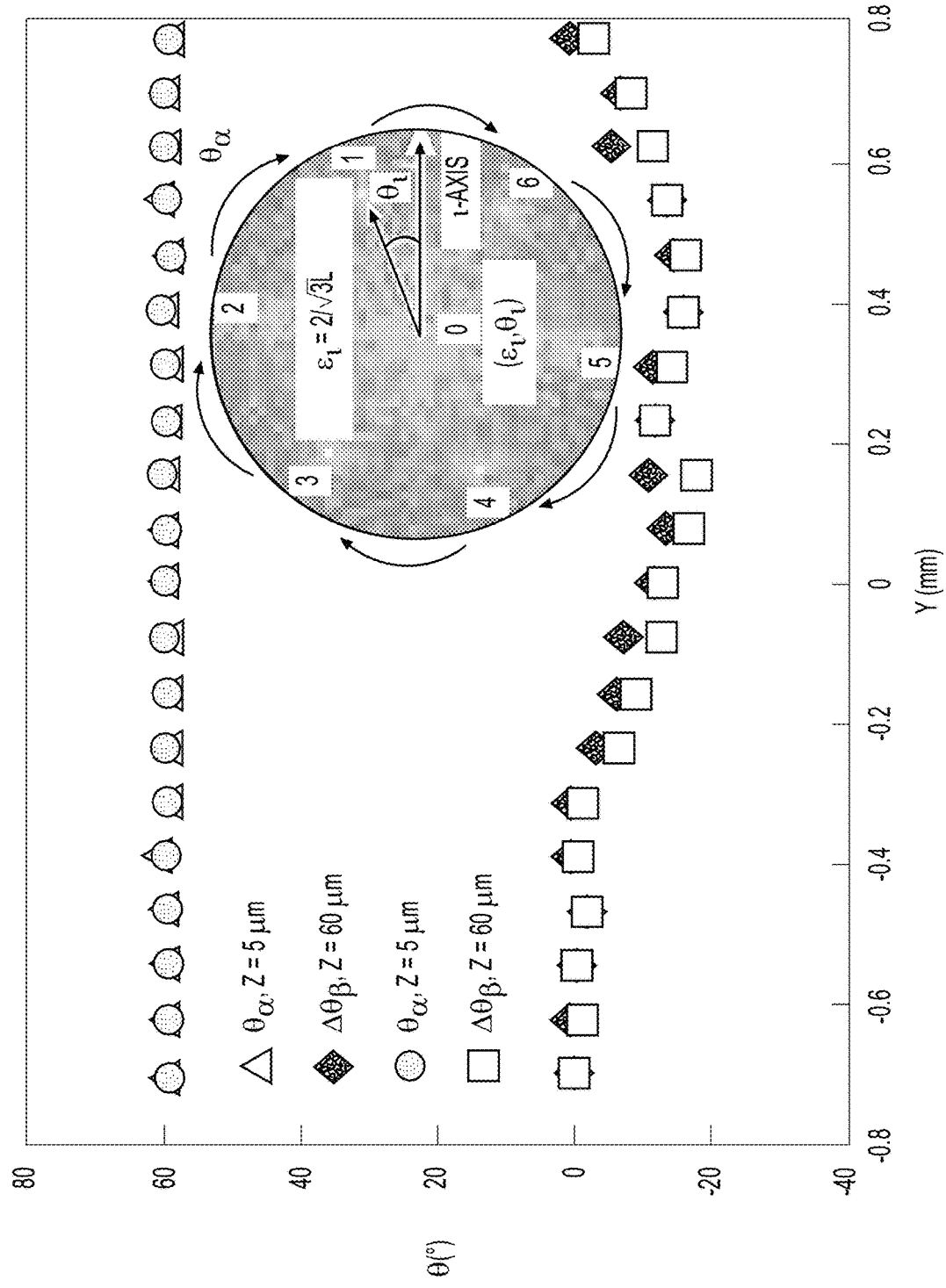

The FFT's taken for each image allow investigation of the crystal orientation as a function of position. Here, the 2D triangular lattice on the top of the crystal is studied. The six Bragg spots are identified as $\theta i(x)=\theta\alpha i+\Delta\theta\beta(x)$, $\theta i(y)=\theta\alpha i+\Delta\theta\beta(y)$, $\theta\alpha=60.0\pm0.4$. FIG. 3A depicts an FFT spectra of the grayscale values in an X-Y plane which were taken over a region 51.84 μm×77.88 μm in every stitched image, taken along the X-direction $\theta_i=\theta_{\alpha i}+\Delta\theta_\beta(X)$ at Y=−0.02 mm, $\theta_\alpha=60.02\pm0.38$ degree at Z=20 μm and $\theta_\alpha=59.99\pm0.5$ degree at Z=120 µm. FIG. 3B depicts an FFT spectra of the grayscale values in an X-Y plane which were taken over a region 51.84 µm×77.88 µm in every stitched image, taken along the Y-direction $\theta_i=\theta_{\alpha i}+\Delta\theta_\beta(Y)$ at X=−6 mm, $\theta_\alpha$=60.04±0.34 degree at Z=5 µm and $\theta_\alpha$=59.98±0.36 degree at Z=60 µm. The six points remain evenly spaced around a circle. Plots of angles $\Delta\theta_\beta(X)$ and $\Delta\theta_\beta(Y)$ in FIGS. 3A and 3B indicate the solid-like relative rotation of ordered particle arrays in an X-Y plane.

Figure 3C:
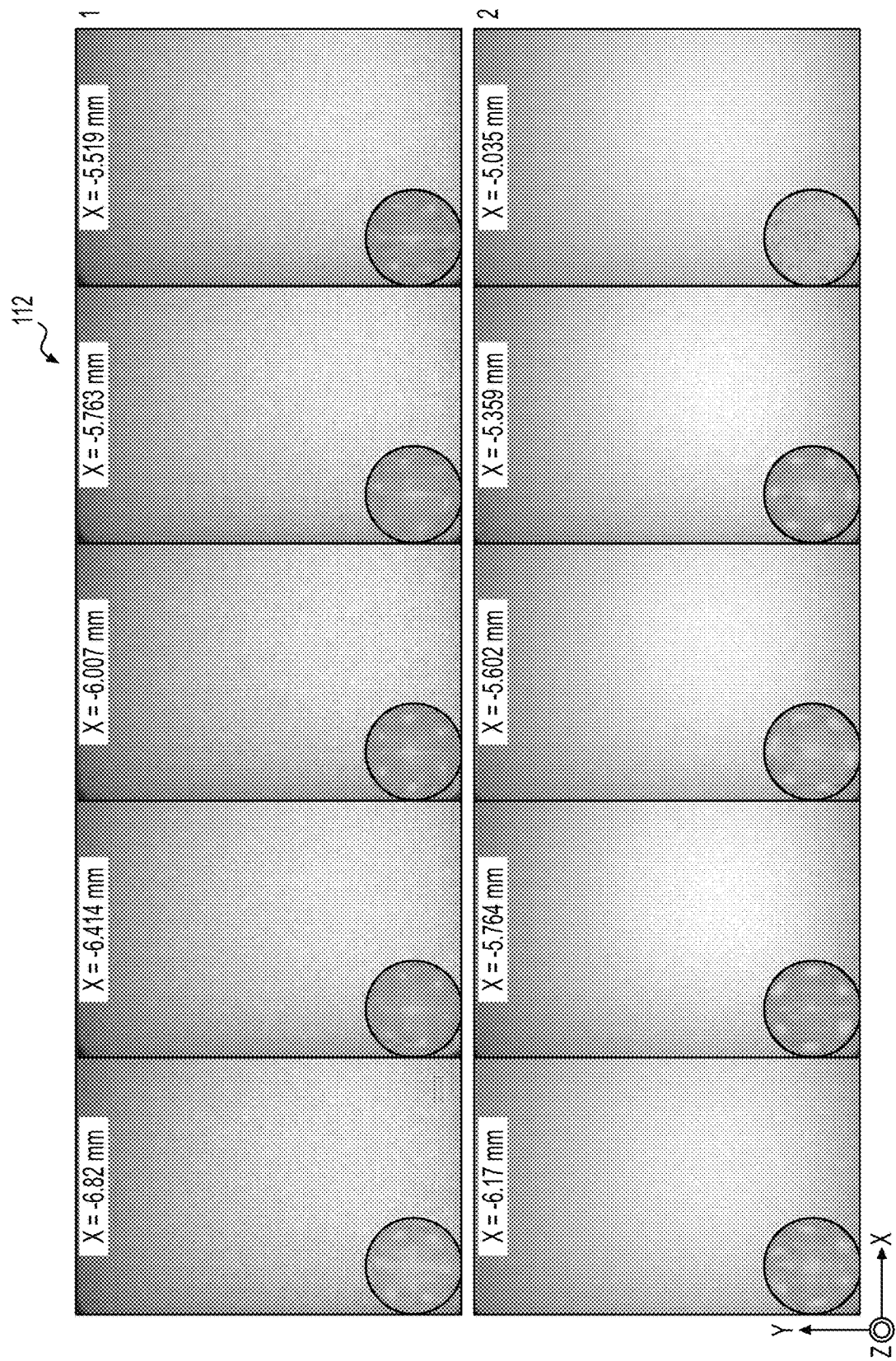
FIG. 3C depicts a selection of confocal images corresponding to the spectra in FIGS. 3A and 3B.

FIG. 3C depicts corresponding images 112 for the FFT plots in FIGS. 3A and 3B, and illustrates the smooth changes in the orientation of the ordered particle arrays. $\theta_\alpha$ is constant across the sample, indicating the triangular lattice is well formed. Also note that the lengths of the Bragg vectors are constant indicting fixed lattice constants. There is a small continuous variation in $\Delta\theta_\beta(x)$ and $\Delta\theta_\beta(y)$ corresponding to slight rotations of the crystal axes with no discontinuities. This indicates that there are continuous strain fields in the crystal but no topological defects are present in either of these plots from 2D and 3D confocal imaging.

Figure 4A:
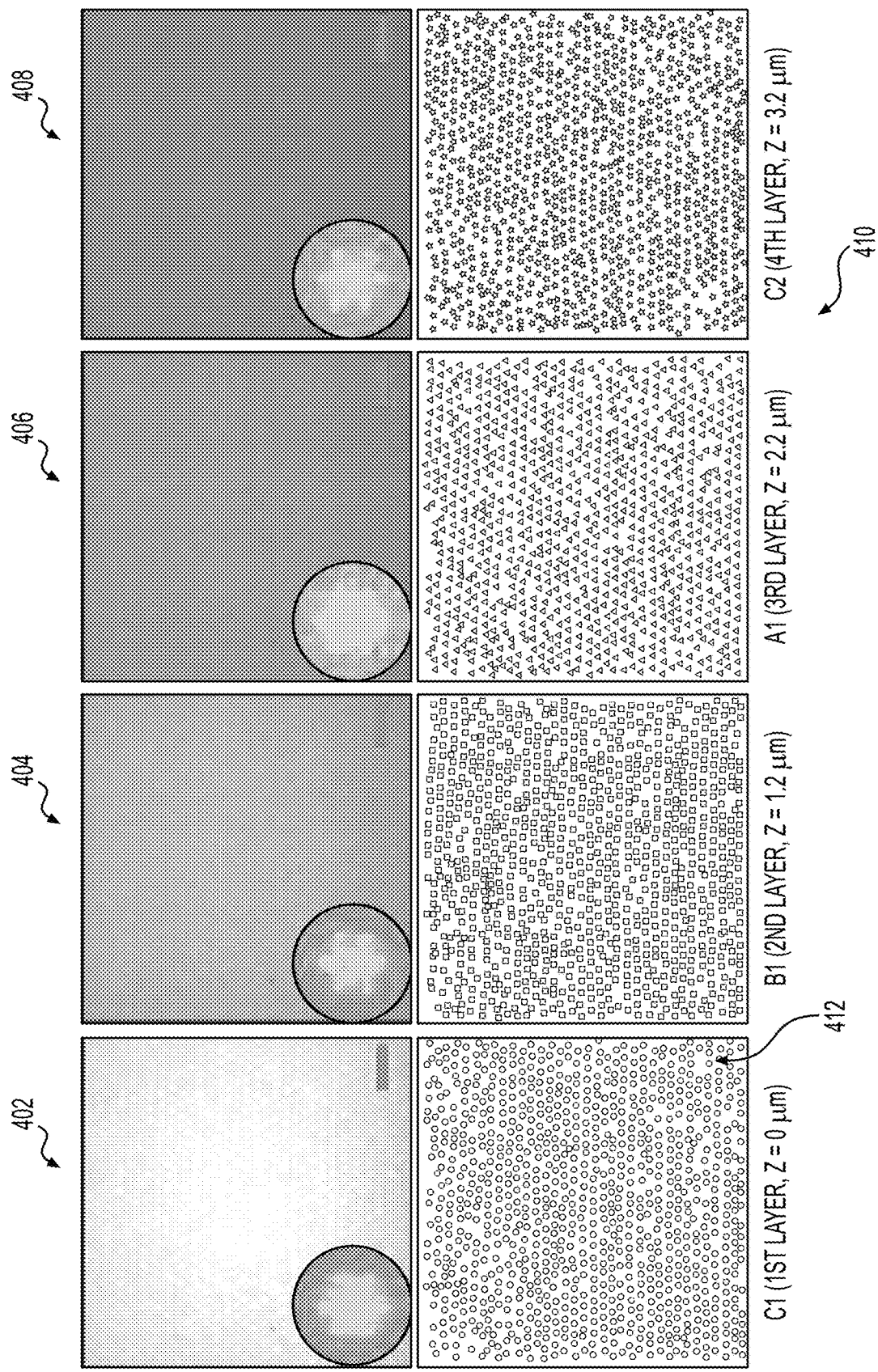
FIGS. 4A and 4B depict illustrations of a Face-Centered Cubic (FCC) stacking structure of the sample of FIG. 1C.
Figure 4B:
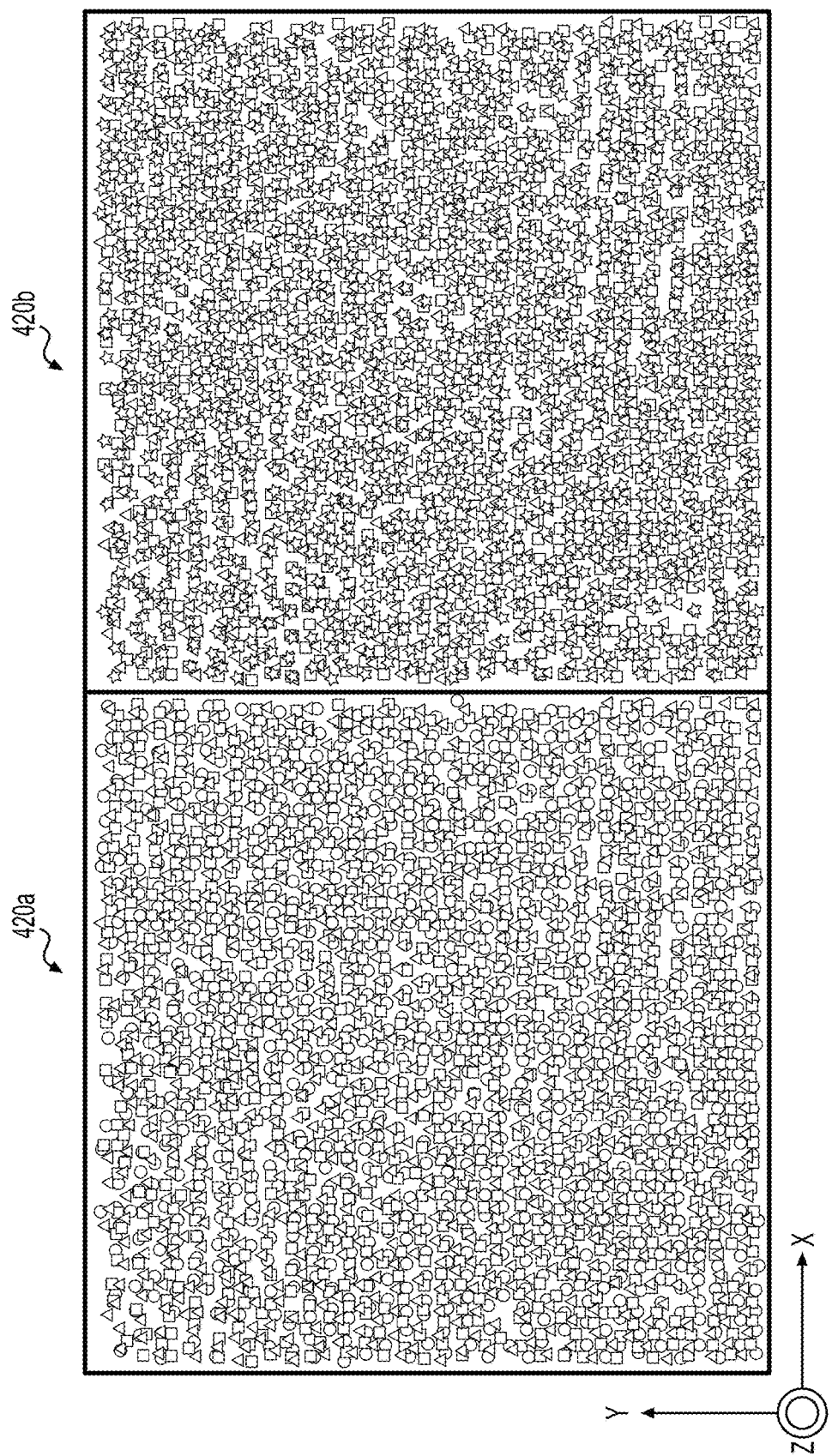

FIGS. 4A and 4B illustrate the FCC stacking structure of the sample. In FIG. 4A, the top portion shows four consecutive particle layers 402-408 in X-Y planes taken in the Z-direction with a step size of 0.2 µm and the bottom portion shows projections 410 of the positions of particle centers 412 for each layer 402-408 on an X-Y plane. Triangular planes may be visualized in the confocal images, and correspond to the densest, stacking, planes of all the structures with volume fraction $\varphi=\Pi/\sqrt{18}$. A technique for distinguishing FCC from HCP is to use confocal microscopy Z scans to locate the distance between the stacked planes, to image the planes and, to observe how particles in neighboring planes sit relative to the plane above and below.

In FIG. 4B, the layers 402-408 are overlaid in composite projections. Specifically, in the left portion of FIG. 4B, layers 402, 404, and 406 are overlaid in composite projection 420a, and in the right portion of FIG. 4B, layers 404, 406, and 408 are overlaid in composite projection 420b. As illustrated in FIG. 4B, layer 402 has its points surrounded by both particles from the second layer 404 and particles from the third layer 406, a signature of FCC. If, instead, this were an HCP lattice, then each point would be surrounded by a particle of one color but not the other. The first layer 402 and the third layer 406 would be the same index and the lattices would eclipse one another. One explanation for the patterns not being perfect is the Brownian motion of the particles and the fact that confocal images are not snapshots but rather raster scans, and thus there is a time lag between different z plots.

A more detailed analysis was performed which included locating the positions of the particles in different layers and measuring their shifts, Ox, Oy, Oz, from the nearest particles in the top layer. In such studies of four contiguous layers, no indication of other than ABC stacking, and in fact no indication of other than ABCA, was observed. Further, confocal images of 20×200×200 unit cells were captured and rendered as a reconstruction in the form of rotatable 3D images, as discussed below.

Figure 5:
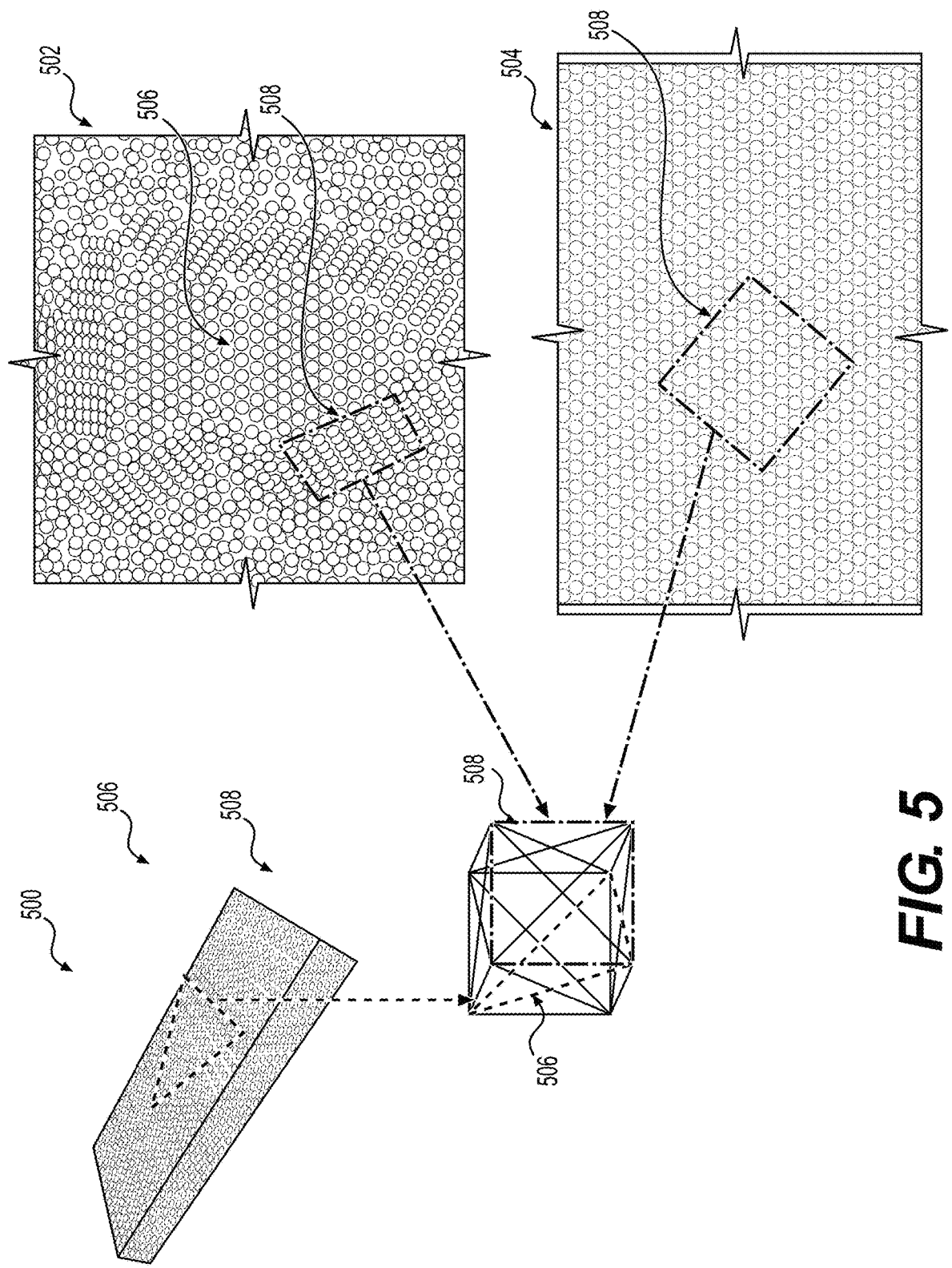
FIG. 5 depicts a visual comparison between a reconstruction of Z stacks of the sample from FIG. 1C and a stacking of Ball bearings.

FIG. 5 depicts a visual comparison between a reconstruction of Z stacks 500 over a volume XYZ and a front view 502 and side view 504 of stacking of Ball bearings. The Z stacks 500 present the hexagonal (111) face 506 and square (100) face 508 uniquely characteristic of the FCC crystal. The presence of both 3 fold and 4 fold symmetries axes with relative axes angles of 127° is a strong evidence for the FCC structure of sample C3's crystal lattice.

Experimental Procedure—Creating Photonic Crystals in long-duration microgravity environment in the ISS.

Microgravity experiments on the ISS were conducted on colloids made of micron-sized fluorescent poly ethyl methacrylate (PMMA) particles. Procedures for synthesis of PMMA particles are described below. Particles were dispersed in decalin/tetralin solvent to match the particle refractive index. Three sample modules total, each loaded with three capillary containers filled with colloids, were delivered to the ISS—one module with colloids of spheres and two with colloids of ellipsoids.

The particle motion and arrangement was visualized at 100× magnification and recorded by the remotely operated ISS confocal microscope. The ISS experiments demonstrated that the colloidal structure formed in microgravity depends on the particle shape and volume fraction as well as on the way the samples were filled and sealed in a capillary container. The colloidal spheres formed a large face-centered cubic (FCC) crystal of the size of its capillary container (27 mm×1.5 mm×0.15 mm) in one sample, but polycrystalline materials formed in other samples.

Figure 6D:
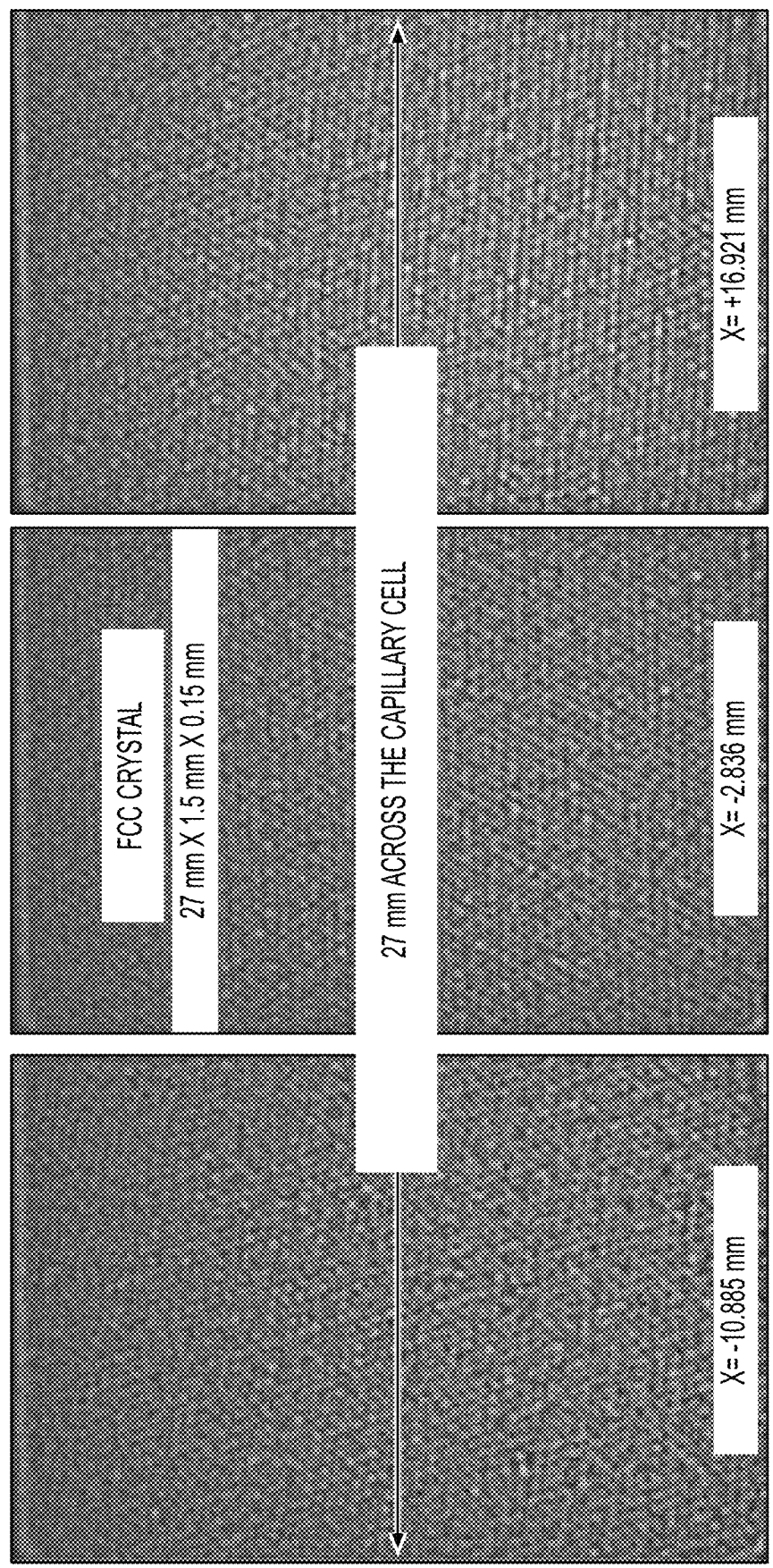
FIG. 6D depicts top views of slices from three crystal samples, according to one or more aspects of this disclosure.

FIG. 6A depicts a perspective view of an exemplary embodiment of a sample module 600 configured to hold capillary containers filled with colloids. FIG. 6B depicts a perspective view of a three-dimensional micro-scope 602 visualizing samples in the sample module 600. FIG. 6C depicts an exemplary perspective view of an individual slice of three-dimensional imaging 604 reconstructed from images captured by the three-dimensional micro-scope 602. In this embodiment, the slice is a 40×20×5 micrometer slice, but any suitable slice size may be used in other embodiments. FIG. 6D depicts top views 608 of slices from the three samples discussed above.

Materials: Methyl methacrylate (MMA, Aldrich, 99%) was passed through a packed column of inhibitor remover (Aldrich) prior to use. Methacrylic acid (MA, Acros, 99%) and 2-hydroxyethyl methacrylate (Sigma Aldrich, 98%) were used as received. A 49:1 (w/w) mixture of methyl methacrylate/methacrylic acid was made and will be referred to as MMA/MA mixture. Exxsol D110 (Houghton Chemical Corp.; boiling point, 237-277° C.), octyl mercaptan (Aldrich, 98.5%), N,N-dimethylethanolamine (DMAE, Acros, 99%), rhodamine B isothiocyanate (RITC, Fluka), 4-aminostyrene (Aldrich, 90%), N,N-dimethylformamide (DMF, Acros, 99%), cis/trans-decahydronaphthalene (cis/trans-decalin, Aldrich, 99%), 1,2,3,4-tetrahydronaphthalene (tetralin, Aldrich 99%), acetone (Fisher Scientific, histological grade), dodecane (Sigma Aldrich, anhydrous, 99%) were used as received. Poly(12-hydroxystearic acid) graft copolymer (PHS-g-PMMA), 40% solution in a 2:1 (w/w) ethyl acetate/butyl acetate mixture, was synthesized. Azo-bis-isobutyronitrile (AIBN, Aldrich) was recrystallized at 0° C. from methanol. Toluene (Fisher Scientific, HPLC grade) and hexanes (Fisher Scientific, mixture of isomers, HPLC grade) were dried through molecular sieves and activated alumina (PureSolv, Innovative Technology, Newburyport, MA).

Synthesis of Fluorescent Monomer: In a 25 mL Schlenk flask, 0.075 g of amine-reactive RITC was dissolved in 10 mL of DMF and stirred. After 10 min, 60 µL of 4-aminostyrene was added to the flask. The reaction mixture was maintained at room temperature for 10 min before transferring the solution to a 50 mL pear-shaped flask. The solvent was gradually removed using a rotary evaporator (35° C. and 100 mTorr) over a 72 h period. The solid product, denoted rhodamine aminostyrene (RAS), was removed and analyzed using Fourier transform infrared (FTIR). It was stored under nitrogen at −30° C. Separately, we another fluorescent dye—julolidine rhodol was synthesized to increase solubility in the particle reaction media. That dye was then reacted with 2-hydroxyethyl methacrylate via STEGLICH esterification in order to co-polymerize with the MM/MMA mixture.

Synthesis of fluorescently-labeled PMMA spheres: In an example, preparation of the PMMA particles included the following synthesis process. RAS was weighed and added to a 20 mL glass vial. The dye was dissolved in acetone using a vortex mixer and was placed in a sonication bath for approximately 30 s. Next, the MMA/MA mixture was combined with the dye solution, followed by additional vortex mixing and sonication. Due to this dye's limited solubility in the organic media, any solid material was filtered through a 0.45 μm poly(tetrafluoroethylene) (PTFE) membrane attached to a glass syringe. RAS solubility was determine to be ~0.01 mg/mL in a 1:28 acetone/monomer (w/w) mixture. Separately, the AIBN was weighed and added to a 100 mL two-neck round-bottom flask. The AIBN was dissolved in the RAS-saturated monomer solution with stirring. The PHS-g-PMMA solution was added next, and the mixture was stirred until homogeneous in appearance. The hexanes and Exxsol D110 were added, followed by the octyl mercaptan, which was pipetted into the reactor. A water-jacketed condenser was attached to the reactor neck for solvent refluxing. The reactor system was evacuated and brought under a slightly positive nitrogen pressure using a Schlenk line.

The round-bottom flask containing the reactants was lowered into a temperature-controlled oil bath at 80° C. At the onset of particle nucleation, typically 5 to 7 min at reaction temperature, the mixture started to become turbid. The suspension media continued to be refluxed until the total reaction time was 2 h. The reactor was removed from the oil bath, and its contents allowed to cool to room temperature. The reaction product was placed in four 24 mL glass vials (~6 mL/vial), and each was diluted with 10 mL of hexanes. The reaction product was then centrifuged at 2,000 rpm for 30 min (IEC Centra CL2). The supernatant was removed and replaced with hexanes (~12 m L/vial), and the particles were re-dispersed. This cycle was repeated three times to ensure that all small particles produced by secondary nucleation were removed. The suspension was centrifuged one final time to replace the supernatant with dodecane. The particles were re-suspended and the mass fraction was adjusted to –30%.

Locking the Stabilizer: The physisorbed graft copolymer stabilizer was covalently attached to the disperse polymer via a condensation reaction between the epoxy rings on the stabilizer anchor polymer and carboxylic acid groups on the PMMA particle surface. The suspension was weighed and added to a 100 mL, two-neck round-bottom flask. A water-jacketed condenser was attached to the reactor for solvent refluxing. The reactor was evacuated and brought under a nitrogen atmosphere and then lowered into an oil bath controlled at 130° C. Once the solvent refluxing began, an amount of DMAE equal to 0.2% of the suspension mass was added to the reactor. The suspending media was refluxed for 2 h, after which time the flask was removed from the oil bath and its contents allowed to cool. Next, the suspension was centrifuged, followed by the decantation of the supernatant and replacement with dodecane. The particle mass fraction was adjusted to approximately 10%.

Particle Characterization: Static light scattering (SLS) measurements were performed using a fiber-optic light scattering instrument (Scitech Instruments, model ST100) to determine the size and polydispersity of the particles. Single-scattering samples were prepared by diluting an aliquot of suspension with decalin which was previously passed through a 0.45 μm PTFE filter to remove dust. The SLS measurements were performed at 25° C. with 488 nm incident light. At each angle, the scattered intensity was normalized by the transmitted beam intensity to correct for laser power fluctuations. The experimental error in the intensity measurements, determined by the standard deviation in the count rates, was typically less than 5% for the smallest angles (8<10°) and less than 1% for all others. Form factors, calculated using Mie theory, were fitted to the experimental scattering data to determine particle diameter and polydispersity.

Information concerning the shape and surface features of particles was obtained via scanning electron microscopy (SEM). SEM samples were prepared by placing a drop of dilute suspension onto a 300 mesh, Formvar-coated copper grid supported by a SEM stub. The suspension was allowed to evaporate, coated with 2-3 nm of iridium using an ion beam sputterer (IBS/TM200S), and imaged using a field-emission scanning electron microscope (Philips XL 30 FEG-SEM). Image analysis to determine dry particle size was done using open-source software (ImageJ).

Sample preparation: Dry, PHS-coated PMMA particles were re-dispersed in a refractive index matching solvent mixture and heat shocked to accelerate the kinetics of tetralin equilibration. The samples were formulated to their desired (effective) volume fraction—including a 'glassy' sample (~0.6)—taking into account a ~10 nm PHS brush on the surface of the PMMA particles. Freezing and melting volume fractions were measured and compared with the corresponding transitions pertaining to the theoretical hard sphere phase diagram. Rectangular glass tubes (VitroCom, 50 mm×2 mm×0.2 mm) were filled with various particle suspensions via capillary action, sealed with indium and epoxy (MasterBond EP42HT-2A0-1 black thermal epoxy), and later mounted on a flight module.

Figure 7:
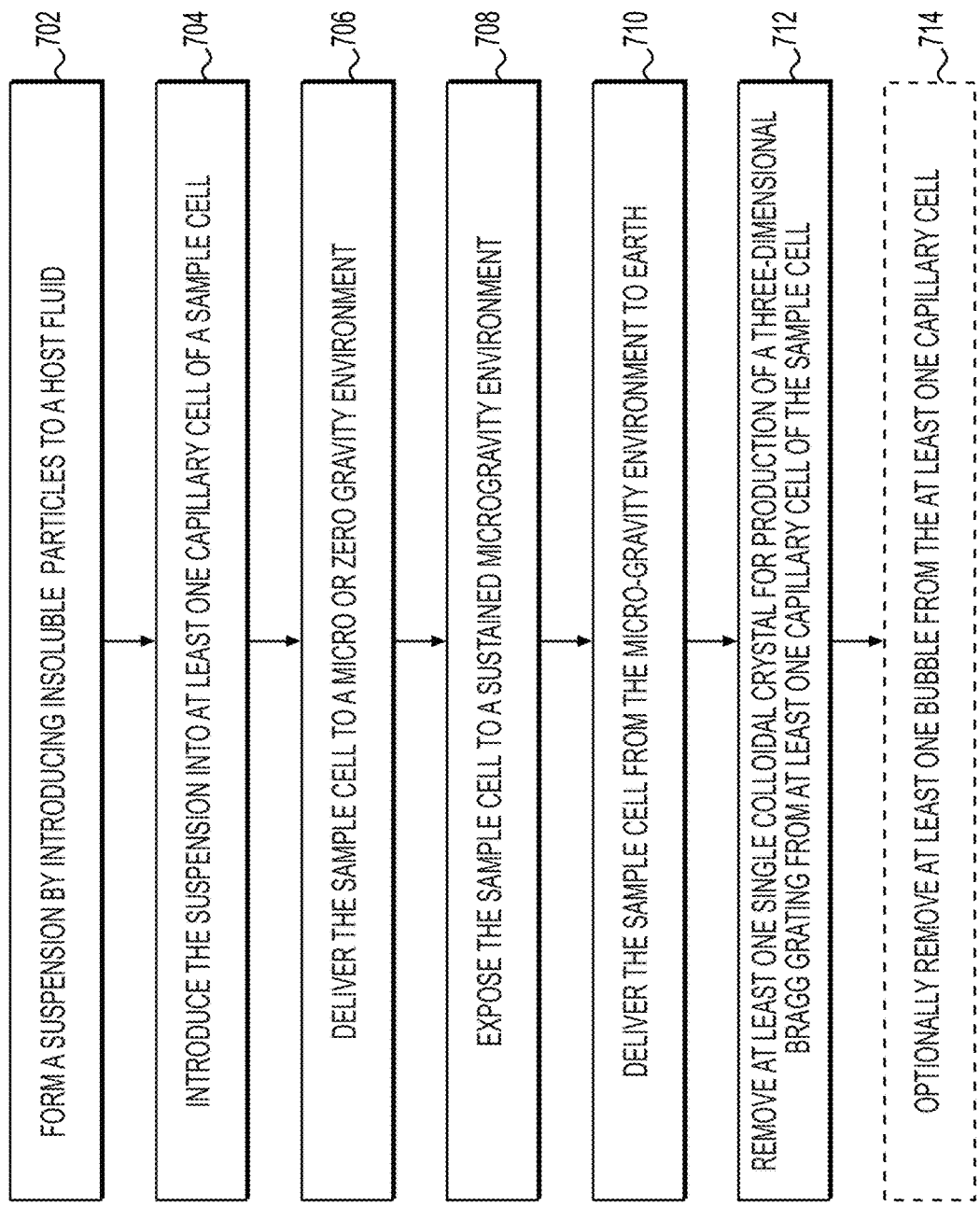
FIG. 7 depicts an exemplary embodiment for producing a three-dimensional Bragg grating, according to one or more aspects of this disclosure.

FIG. 7 depicts an exemplary embodiment of a methodology for producing a three-dimensional Bragg grating, according to one or more aspects of this disclosure. It should be understood that, in various embodiments, steps for producing a three-dimensional Bragg grating may be added, removed, modified, and/or re-arranged in any suitable manner. At step 702, a suspension may be formed by introducing insoluble particles to a host fluid, e.g., to form a suspension. In some embodiments, a particle volume fraction of the suspension may be within a solid state region of a suspension phase region, e.g., at an operating temperature and operating pressure for the production. The particles may be, for example, particles that are insoluble single-component or composite, homogenous or heterogeneous, and spherical or anisotropic. In some embodiments, the host fluid may have a refractive index matching a refractive index of the suspended. The insoluble synthetic particles may have a particle size such that a grating constant of the produced three-dimensional Bragg grating is comparable with a wavelength of infrared light for which the three-dimensional Bragg grating is configured for coherent scattering.

In some embodiments, a nucleation element may be introduced into the suspension. The nucleation element may be configured to act as a nucleation site for a nucleation event for crystal growth in the sustained microgravity environment. In an example, the nucleation element may include a stir bar, such as a magnetic stir bar or the like.

At step 704, the suspension may be introduced into at least one capillary cell of a sample cell. The at least one capillary cell may have a flat and/or curved surface and rounded edges. In some embodiments, a surface or edge of the at least one capillary cell may be matched to a lattice structure of a cell wall surface of a crystal to be grown. In some embodiments, the suspension may be introduced such that at least one bubble is present in the at least one capillary cell.

At step 706, the sample cell may be delivered to a micro or zero gravity environment, e.g., a low-earth-orbit. At step 708, the sample cell, and thus the suspension therein, may be exposed to a sustained microgravity environment. Such exposure may include, for example, maintaining, in the low-earth-orbit, a temperature of the at least one capillary cell above a freezing temperature of the host fluid below a boiling temperature of the host fluid. In some embodiments, the presence of the nucleation element, e.g., a stir bar, may promote large crystal growth during the exposure. In some embodiments, the nucleation element may be moved or operated during the exposure, e.g., during a initiating period of crystallization, etc.

At step 710, the sample cell may be delivered from the micro-gravity environment, e.g., low-earth orbit, to Earth. Delivery to and/or from the micro-gravity environment may include exposure of the sample cell to large gravity accelerations, e.g., up to 6g's.

At step 712, at least one single colloidal crystal for production of a three-dimensional Bragg grating may be removed from the at least one capillary cell.

In some embodiments, at any suitable stage of the production, at step 714, at least one bubble may be removed from the at least one capillary cell.

In an exemplary embodiment, a three-dimensional Bragg grating may include or be in the form of a single colloidal crystal. The single crystal may include a plurality of repeated, e.g., ordered, layers of material having different refractive indexes. It should be understood that the different refractive indexes may be a result of the particles having a particular refractive index, and an interstitial region (e.g., void volume) having a different refractive index from that of the particles. In other words, the layers of materials may include layers of the particles alternating with layers of an interstitial region. An example of such structure includes a fixed periodic network of poly-methyl methacrylate (PMMA) in air (e.g., a direct lattice), a back-filled (inverse) lattice of a material such as TiO$_2$, or the like, in which polymeric material has been dissolved away following infiltration of the material. It should further be understood that an ordered polymer lattice (e.g., FCC) in air may not produce a full band gap. Materials with a refractive index larger than 2.85, however, may realize a full photonic band gap. Such structures may be produced, for example, via sol-gel chemistry or atomic layer deposition (e.g., with a protective oxide layer) followed by chemical vapor deposition at higher temperature using vaporized TiO$_2$ precursors, for example, or in another example using silane gas for a silicon inverse lattice. In some embodiments, at least one of the plurality of repeated layers, e.g., one or more layers of the particles, may be formed from micron-sized spheres. A size of the spheres may influence or determine a photonic response of the Bragg grating. Micron-sized spheres may be associated with a photonic response in the infrared range. In other embodiments, smaller colloids may be used, although size poly-dispersity may rise to 4-5%. In some embodiments, the micron-sized spheres mat have a particle size variation of about or less than 10%, e.g., less than 5%.

In some embodiments, the micron-sized spheres have been stabilized against aggregation, e.g., by coating the particles and/or introducing an additive such as a surfactant, a salt, and/or a polymer. In an example, a Bragg grating may include at least one stabilizing layer or coating, such as a layer or coating formed from a graft copolymer including an insoluble anchor group and soluble side chains. In an example including a surfactant, the surfactant may result in a thin, e.g., ~10 nanometer layer coating each sphere while the particles are dispersed in the suspension (e.g., decalin-tetralin). While such a coating may introduce a (likely small) refractive index contrast, such contrast may diminish or be removed during production as the polymer structure is dried out and the layers collapse. Various examples of a stabilizer may include, e.g., for organic media, Poly(12-hydroxystearic acid) (PHS), having a refractive index of 1.468, PMMA, having a refractive index of 1.49, polydimethylsiloxane (PDMS) having a refractive index of 1.43, poly (isobutylene succinimide) (PDMS), or grafted polystyrene (PIBSI), or for inorganic media such as silica, trimethoxysilyl-terminated PHS. However, it should be understood that the foregoing are examples only, and that any suitable stabilizer or the like may be used.

In some embodiments, the Bragg grating may include a fluorescent dye incorporated covalently to constituent polymer chains comprising the micron-sized spheres. The fluorescent dye may assist with microscopy studies (i.e., visualization) of the three-dimensional crystal structure, for example.

In an exemplary embodiment, a sample cell for producing a volume Bragg grating may include an internal shape that forms at least one capillary cell having a flat and/or curved surface and rounded edges. In another exemplary embodiment, the sample cell may include an internal shape that forms a flat cell with a stopper or threaded closure. Such a stopper or threaded closure may facilitate or include a septum configured to enable a needle or syringe, to introduce, manipulate, or evacuate a gas bubble within the sample cell. In an further exemplary embodiment, rectangular capillaries, e.g., with a width of 200 microns, may facilitate confocal microscope observation. In some embodiments, a surface or edge of the at least one capillary cell may be matched to a lattice structure of a cell wall surface of a crystal to be grown.

In some embodiments, the sample cell may include a seal configured to inhibit or limit solvent evaporation from the at least one capillary cell. In some embodiments, the seal may be configured to operate over the course of production of a crystal. In some embodiments, the seal may be configured to limit evaporation of the solvent to less than 2% over a period of 3 months. In an exemplary embodiment, the seal may include or be formed from an indium metal with an overcoating of epoxy. In various embodiments, such a seal may supplement a closure, e.g., of a stopper or threaded closure.

In some embodiments, the sample cell may be configured to maintain, in a zero or micro-gravity environment such as a low-earth-orbit environment, a temperature of the at least one capillary cell above a freezing temperature of a solvent for generating the volume Bragg grating and below a boiling temperature of the solvent. In some embodiments, the sample cell may be configured to withstand a gravity acceleration of up to 6g's or more, e.g., without significant deformation and/or without damage or disruption to the at least one capillary cell. In some embodiments, the sample cell may be configured to enable addition and/or removal of at least one bubble from within the at least one capillary cell, e.g., via a septum providing access for a needle or syringe, as noted above.

Figure 8:
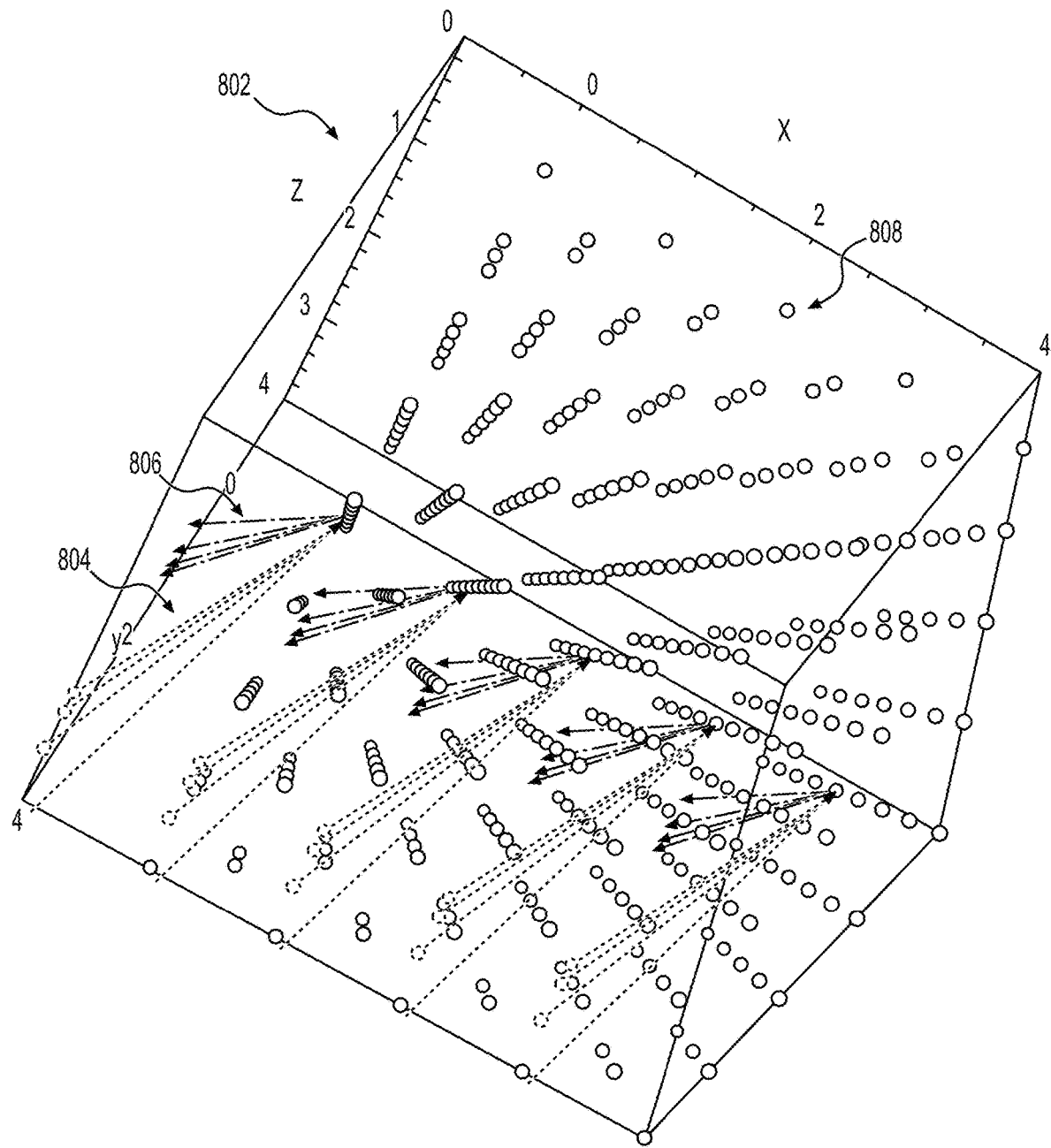
FIG. 8 depicts a schematic of Bragg scattering from a 3D colloidal crystal, according to one or more aspects of this disclosure.

FIG. 8 depicts a schematic of Bragg scattering from a 3D colloidal crystal 802, according to one or more aspects of this disclosure. In FIG. 8, various colors/wavelengths of incoming light 804 are directed into different scattering angles, sorted into different colors/wavelengths of outgoing light 806. In an exemplary embodiment, the outgoing light 806 may be infrared light. In an exemplary embodiment, the scattering angles may be based on various factors, such as a size of particles 808 forming the 3D colloidal crystal 802, color/wavelength of the incoming light 804, etc.

The band gap in FCC photonic crystals is generally relatively narrow. As such, stacking faults, dislocations, point defects, or the like, can reduce or close that gap, e.g., contaminating the band gap with localized photonic states. Conventional, e.g., terrestrially produced FCC single colloidal crystals have been recorded having 1% stacking faults and 1000 ppm point defects per unit cell, and were only produced having a lateral dimension of about 100 microns, with a volume of about $2.5 \times 10^{-6}$ mm$^3$. Photonic crystal produced using one or more aspects of this disclosure, in contrast, had a volume of about 20 mm^3.

It should be understood that the reentry process may act to perturb or damage a produced crystal. In some embodiments, a fixation process may be performed following crystallization. For example, a photocross-linker such as cinnamyl methacrylate or 2-cinnamoyloxyethyl may be incorporated into the constituent polymer chains. In another example, in a slightly swelling solvent, touching particle surfaces might induce photo-dimerization of adjacent cinnamyl molecules under ultraviolet radiation.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the invention requires more or less features than are expressly recited in any example or embodiment.

Furthermore, while some embodiments described herein include some but not other features included in other embodiments, combinations of features of different embodiments are meant to be within the scope of the invention, and form different embodiments, as would be understood by those skilled in the art.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above-disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure shall not be restricted or limited by the foregoing detailed description. While various implementations of the disclosure have been described, it will be apparent to those of ordinary skill in the art that many more implementations are possible within the scope of the disclosure.

We claim:

1. A three-dimensional Bragg grating, comprising:
a single colloidal crystal that:
includes periodic particles and interstitial material, and due to having been grown in a micro-gravity environment:
is topological defect free; and
lacks a high-density glass phase.

2. The three-dimensional Bragg grating of claim 1, wherein the periodic particles are formed from fluorescent poly ethyl methacrylate.

3. The three-dimensional Bragg grating of claim 1, wherein the single colloidal crystal is a Face Centered Cubic crystal.

4. The three-dimensional Bragg grating of claim 1, wherein the three-dimensional Bragg grating is a volume Bragg grating, and has a volume on the order of millimeters cubed.

5. The three-dimensional Bragg grating of claim 1, wherein the periodic particles are micron-sized spheres.

6. The three-dimensional Bragg grating of claim 5, wherein the micron-sized spheres have a particle size variation of less than 5%.

7. The three-dimensional Bragg grating of claim 5, further comprising:
at least one stabilization layer or coating configured to stabilize the micron-sized spheres against aggregation.

8. The three-dimensional Bragg grating of claim 7, wherein the at least one stabilization layer or coating is formed from a graft copolymer including an insoluble anchor group and soluble side chains.

9. The three-dimensional Bragg grating of claim 1, wherein the single colloidal crystal lacks dendritic growth instabilities.

10. The three-dimensional Bragg grating of claim 1, wherein the single colloidal crystal has a lateral dimension of about 100 microns and a volume of about 20 mm^3.

11. The three-dimensional Bragg grating of claim 1, wherein the single colloidal crystal has a volume with:
a first dimension on the order of tens of millimeters;
a second dimension on the order of millimeters; and
a third dimension on the order of tenths of millimeters.

12. The three-dimensional Bragg grating of claim 1, wherein the single colloidal crystal has dimensions of 27 mm×1.5 mm×0.15 mm.

13. The three-dimensional Bragg grating of claim 1, wherein the interstitial material includes air, such that the single colloidal crystal is a direct lattice.

14. The three-dimensional Bragg grating of claim 1, wherein the periodic particles are configured to be dissolvable such that the interstitial material is configured to form a back-filled or inverse lattice.

15. The three-dimensional Bragg grating of claim 14, wherein the interstitial material includes $TiO_2$.

16. The three-dimensional Bragg grating of claim 1, wherein the single colloidal crystal has been solidified or crosslinked with a solvent.

17. The three-dimensional Bragg grating of claim 16, wherein the single colloidal crystal further includes a photocross-linker incorporated into constituent polymer chains.

18. The three-dimensional Bragg grating of claim 1, wherein the single colloidal crystal is configured to withstand about 6g's of gravity acceleration.

19. The three-dimensional Bragg grating of claim 1, wherein the single colloidal crystal is a photonic crystal.

20. The three-dimensional Bragg grating of claim 1, wherein the single colloidal crystal has a bandgap in the infrared range.

* * * * *